March 10, 1959 A. MELAS 2,877,336
APPARATUS FOR ASSEMBLING BOX PENS
Filed Nov. 6, 1956 2 Sheets-Sheet 1
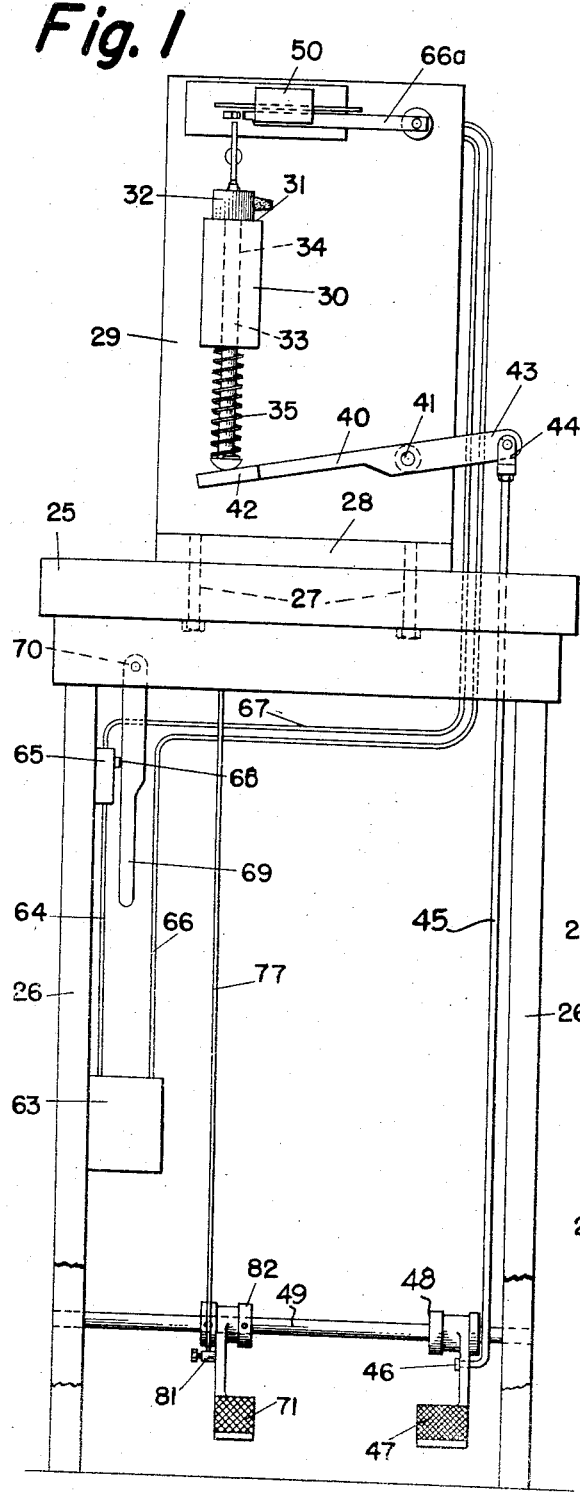
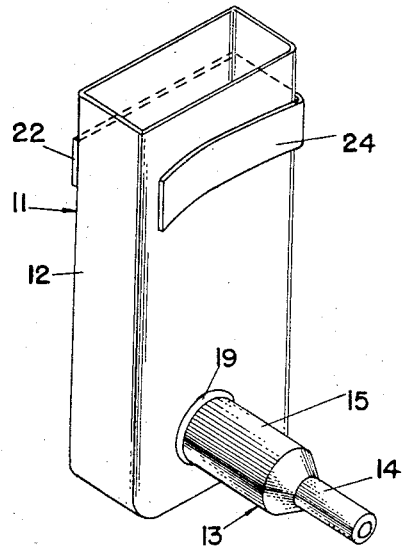
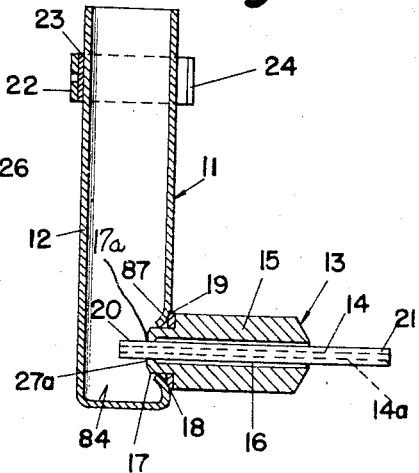
INVENTOR.
ADALBERT MELAS
BY Jones, Darby & Robertson
ATTORNEYS

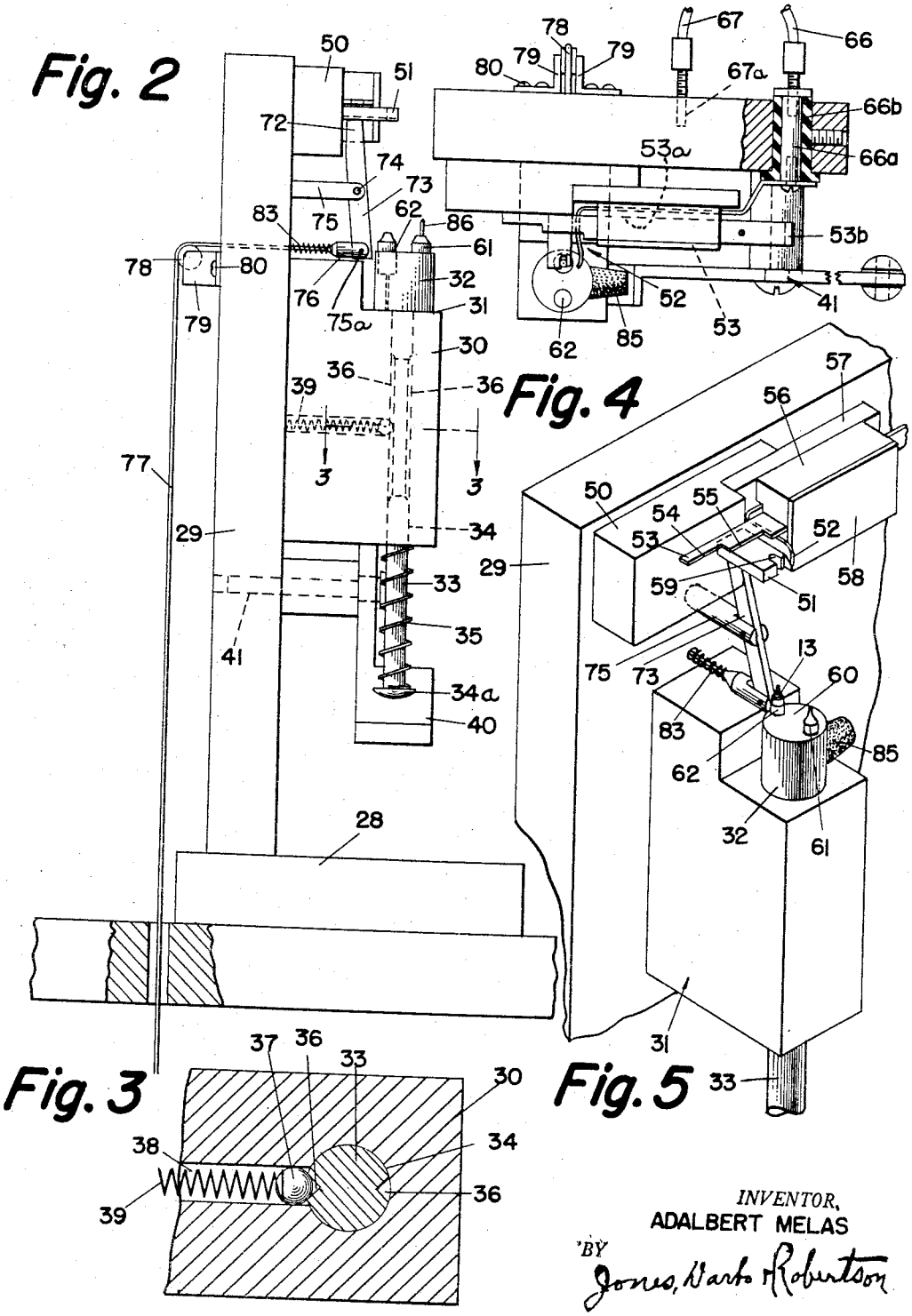

United States Patent Office 2,877,336
Patented Mar. 10, 1959

2,877,336

APPARATUS FOR ASSEMBLING BOX PENS

Adalbert Melas, Bala-Cynwyd, Pa., assignor to Burgess-Manning Company, Libertyville, Ill., a corporation of Illinois Application November 6, 1956, Serial No. 620,725

10 Claims. (Cl. 219—85)

This invention relates to apparatus for assembling box pens such as are used in chart recorders and more particularly for the assembly of the box pen disclosed and claimed in my co-pending application Serial No. 608,511 filed September 7, 1956 entitled "Recorder Pen Assembly."

Among other objects, the invention aims to provide apparatus for the purpose described, such as temperature and pressure recorders, which is relatively simple and markedly efficient, effecting a substantial saving in time and labor of assembly.

An important object of the invention is the provision of an apparatus which pierces the ink reservoir box for the reception of the pen proper and which apparatus may be then indexed to register the pen with the pierced opening in the box after which the parts, while held in position, are soldered, and finally ejected in finished form.

These and other objects and advantages will be apparent from the following description, taken together with the accompanying drawings, of an illustrative apparatus embodying the present invention, and in which drawings—

Figure 1 is a front elevational view of the apparatus;

Figure 2 is a side elevational view, somewhat enlarged, of the main body of the apparatus;

Figure 3 is a still further enlarged partial cross section taken on the line 3—3 of Fig. 2;

Figure 4 is a plan view, partly in section, on the scale of Fig. 2;

Figure 5 is a perspective view of the indexing and operative parts;

Figure 6 is a perspective view of the completed box pen; and

Figure 7 is a vertical cross section of the box pen of Fig. 6, but prior to completion of the soldering operation.

Reference is made to my hereinabove mentioned co-pending application for a detailed description of the recorder pen or so-called box pen as here shown completely assembled in Fig. 6, and with all parts assembled, but not yet soldered together in Fig. 7, it being sufficient for present purposes to indicate that the present box pen 11 includes the box-like metallic ink reservoir 12 and the pen proper 13, the latter, in accordance with the construction disclosed and claimed in my said co-pending application, including an open-ended tube 14 having therethrough a capillary passageway 14a, the tube being mounted in a bushing 15 to project therefrom at each end, the bushing 15 having a through bore 16 that receives the tube 14 and having a reduced end 17 that is crimped to the tube 14 as at 17a to hold the bushing and tube in assembly. The bushing end 17 passes through a pierced or other mating opening 18 in the front wall of the box 12 and is then soldered therein, as by having a fluxed solder ring 19 placed on the bushing reduced end 17 before it is inserted in the opening 18, the assembly then being heated to fuse the solder ring and provide a tight seal at the opening 18 while securely mounting the bushing 15 in the box 12, the inner end 20 of the tube 14 providing a barrel for the pen through which the ink from the reservoir 12 flows to the nib or point 21, the latter being adapted to contact the record chart of the recording instrument in a manner well known to the art. For mounting the box 12 on the swinging pen-carrying arm of the recording device, the box is provided with a strap 22 that is soldered to the box at one side as at 23, also conveniently by means of a suitably fluxed solder disc inserted between the strap and the box surface, the strap 22 having at its opposite side a spring clip 24 for mounting the box.

Turning now to the apparatus of the present invention for effecting the assembly just described, and in accordance herewith, there is here shown a table 25 having legs 26 that carries by bolts 27 a platform 28 upon which is mounted a pedestal 29, upon which, overhanging the platform 28, is secured an operating jib piece 30 upon which, on a shoulder 31 thereof, is carried a rotatable and reciprocable turret 32. The turret 32 is reciprocable toward and away from the shoulder 31, as by being carried on a plunger rod 33 that passes slidingly and rotatively through a bore 34 in the jib piece 30 and depends therebelow, where, between its terminal enlargement 34a and the jib piece 30, is carried a compression coil spring 35 that urges the plunger rod 33 downwardly normally to cause the turret 32 to abut the shoulder 31 of the jib piece. The turret, plunger rod and spring, are rotatable with respect to the headpiece 30 and are indexed therein to positions 180 degrees apart as by having diametrically opposite longitudinal grooves 36 in the plunger rod, in one of which, at a given time is received the ball detent 37 that plays in a cavity 38 (Fig. 3) that intersects the plunger rod bore 34 and is urged thereinto by the compression coil spring 39 that abuts at its other end the pedestal 29 closing the cavity 38 at that end.

The plunger rod 33 is moved upwardly against the force of the coil spring 35, to move the turret 32 upwardly, by a lever 40 that is pivoted or fulcrumed at 41 on the pedestal 29 and has a lever arm 42 that underlies the rod enlargement 34a, the latter being desirably of toroidal contour to minimize friction between it and the lever arm 42. The opposite lever arm 43 of the lever 40 is articulated as at 44 with a pull rod 45 that extends downwardly to the point adjacent the floor and which is there articulated as at 46 with a pedal 47 that has a hub 48 that is rotatable on a bearing bar 49 secured between the legs 26 of the table.

Above the jib piece 31 the pedestal 29 carries a jutting head block 50 from which projects a mandrel 51 in the shape of an element snugly fitting the interior of the ink reservoir box 12 of the pen assembly 11, such snug fit being assured by a spring tongue 52 that forms in effect a part of the mandrel 51 and that enters the box 12 with the mandrel, the spring tongue 52 also, as presently described, providing an electrode for the current.

Overlying the mandrel 51 but spaced thereabove a distance just slightly greater than the thickness of a wall of the reservoir box 12 is a gauge plate 53 having a plurality of relatively offset edges 54 and 55, for example, thereon, this gauge plate 53 being slidable in a slot 53a of block 56 that is mounted on a dielectric spacer 57 secured on the face of the pedestal 29 adjacent the head block 50, selectively to present either the edge 54 or the edge 55, for example, to a position just over the mandrel 51. A face plate 58 closes slot 53a and the gauge plate has a bail 53b that projects beyond block 56 and may be used as a handle for sliding the gauge plate. The mandrel 51 at its forward edge has a notch or recess 59 extending therethrough, the purposes of the gauge edges 54 and 55 and the notch 59 being fully explained hereinafter.

Reverting to the description of the turret 32, the latter on its upper face 60, at diametrically opposite places thereon, corresponding to and registering radially respectively with the grooves 36 in the plunger rod 33, carries a piercing tool 61 and a receptacle 62 for the pen assembly 13 of the box pen.

When the box 12 is located on the mandrel 51, as later described in more detail, an electric circuit is capable of being established from, say, a suitable transformer and timer 63 carried on one of the table legs 26 and which may be placed in circuit with any suitable source of current (as need not be here further described) and from which a wire 64 runs to a switch 65 and another wire 66 runs to the spring electrode 52 through a connecting element 66a insulated by dielectric sleeve 66b. Another wire 67 from the switch 65 is grounded on the machine frame, as at 67a. For actuating the switch the latter has a switch pin 68 that is in engagement with a knee lever 69 that is loosely pivoted at 70 on the table 25 and that may be pressed by the knee of the operator to depress the normally outwardly spring urged switch pin 68 to close the circuit through the switch 65 for predetermined voltage pressure and duration controlled by a rheostat and timing device respectively, current passing through the box structure 12 heating it sufficiently to melt the solder ring 19 and disc 23 to solder pen bushing 15 and strap 22 to the box.

After the soldering operation is completed, a pedal 71 is pressed by the operator to move forwardly the upper end 72 of an ejector arm 73 that underlies the mandrel 51. The ejector arm 73 is shown intermediately fulcrumed at 74 on a support stud 75 that is rigid with the head block 50 below the mandrel 51. The lower end of the arm 73 is articulated at 75a with a bob 76, the other end of which is connected to a pull cord or wire 77 that runs over an idler pulley 78 journaled by lugs 79 secured to the pedestal 29 as at 80 and that runs downwardly toward the floor where it is connected as at 81 with the pedal 71, the pedal 71 being rigid on a hub 82 that is rotatable on the bearing rod 49 like the hub 48 of the pedal 47. When the pedal 71 is not depressed, the bob 76 is urged forwardly by a compression coil spring 83 that is interposed on the wire 77 between the bob 76 and the pedestal 29, thus normally retracting the upper end 72 of the ejector arm 73 to a position back of the gauge plate 53.

Operation of the apparatus is as follows:

Depending upon the location on the box 12 desired for the strap 22, the gauge plate 53 is adjusted to present the proper gauge edge, as for example, 54 or 55, to a position just overlying the box 12, one of these edges serving as a guide or stop for locating the strap 22 on the box 12 in proper position depending upon the strap position desired for a particular recorder instrument installation. An ink reservoir box 12 then is slipped onto the mandrel 51 and over the spring electrode 52 at the same time. The box 12 is telescoped onto the mandrel 51 until the inner or closed end 84 of the box abuts the end of the mandrel, the box 12 at this time sliding under the gauge plate 53.

The turret 32 having been rotatively indexed, as by means of a handle 85 thereon, to locate the piercing tool 61 carried by the turret directly under the notch 59 in mandrel 51, the pedal 47 is pressed by the operator to raise the turret, through the connecting rod 33, causing the punch 86 of the piercing tool 61 to pass through the wall of the box 11 and form therein the pierced aperture 18. The metal displaced by punch 86 is bent inwardly, as shown, to form an opening slightly smaller than the outside diameter of the reduced end 17 of pen bushing 15.

Upon release of the pedal 47, the turret 32 is depressed by action of the spring 35, withdrawing punch 86 from the aperture in the box. The pen assembly is inserted in receptacle 62 (as shown in Fig. 5) with the end thereof to be inserted into the reservoir box pointing upwardly, the fluxed solder ring 19 being placed upon the shoulder of pen bushing at the reduced end 17 thereof. The strap 22 is placed over the box 12, with the closed end thereof to the left and flat side thereof, on upper face of box 12, simultaneously a suitably fluxed solder disc is interposed between strap 22 and box 12. Gage edge, as for example 54 or 55 determine location of strap 22. The operator, by means of the handle 85, rotates the turret 32 180 degrees to its diametrically opposite position so that the pen receiving receptacle 62 is directly beneath the aperture 18 in the box 12, the latter being still on the mandrel 51. Then the pedal 47 is pressed again, raising the turret a second time and with it the pen assembly 13. As the turret moves upwardly toward the box 12, the reduced end 17 of the bushing 15 of the pen assembly 13 is pressed through the opening 18 in the box, previously formed by the piercing tool 61. The displaced margins 87 of the aperture 18 (Fig. 7) made by the piercing tool make a frictional circular contact with the reduced end 17 of the bushing 15 and serve to hold the bushing temporarily in place in the box 12 depending therefrom as the box is located on the mandrel.

Next the operator moves the knee lever 69 to close the switch 65, thereby causing current to flow through box 12 through electrodes 51 and 52 for a pre-determined interval controlled by the timer associated with transformer 63, heating the box and pen assembly so that the solder inserts 19 and 23 are fused and, upon cooling which follows immediately upon the opening of the electrical circuit, adhere to the adjacent surfaces of the parts.

Next, the pedal 71 is depressed to actuate the ejector arm 73 and push the completed assembly of box and pen shown in Fig. 6, off of the mandrel 51.

It is to be understood that the invention is not intended to be limited to details of construction shown for purposes of exemplification, and furthermore, it may not be essential that all features of the invention be used conjointly since the various combinations and sub-combinations may at times be advantageously employed, and such changes may be made as fall within the scope of the appended claims without departing from the invention.

What is here claimed is:

1. Apparatus for assembling box pens embodying an ink box and a tubular pen in communication therewith, comprising, a mandrel for receiving the box of the box pen assembly thereon, said mandrel having a recess therein, plunger mounted means carrying a piercing tool registering with said recess for piercing the box, said plunger mounted means being rotatable and also at a position diametrically opposite to the piercing tool carrying means providing a receptacle for the pen to be soldered into said box through the piercing, means for completing an electric circuit through said mandrel including said box and an electrode contacted by the box, said electrode being received in the box with the mandrel, to heat the box for fusing solder carried adjacent to said piercing in the box, and an ejector arm pivotally mounted adjacent the mandrel for moving the box pen assembly off the mandrel.

2. The structure of claim 1 wherein the plunger mounted means is manually rotatable independently of the reciprocated position.

3. The structure of claim 1 wherein the plunger mounted means is controlled by a pedal, first to pierce the box, and then to locate the pen in the pierced hole.

4. The structure of claim 1 wherein the plunger mounted means is manually resiliently indexed to either of two diametrically opposite positions to effect registering of the recess with the piercing means and with the pen receptacle respectively.

5. The structure of claim 4 wherein the indexing means includes a pair of longitudinal grooves in the plunger and a ball spring pressed into one of said grooves selectively.

6. The structure of claim 1 wherein a gauge plate having a pair of relatively offset edges is movably mounted adjacent to said mandrel to present selectively one of said edges to a position transversely overlying but spaced from the mandrel whereby the box may be slid on the mandrel under said gauge plate and the position of a strap to be secured to the box may be determined by the gauge plate.

7. Apparatus for assembling box pens including an ink box and a tubular pen in communication therewith, comprising, a table, a pedestal mounted on said table, a jib block carried by the pedestal overhanging said table, a vertical bore through said jib block, a rotatable and reciprocable plunger located in said bore, said plunger carrying at its upper end a turret, said turret carrying on its upper surface at diametrically opposite points thereof a piercing tool and a pen receptacle, a mandrel carried by said pedestal above said turret having a recess therein registering with said piercing tool or said receptacle selectively, means for rotating the turret to provide said selection, a lever pivoted on the pedestal engaging the lower end of said plunger at one end, a pull rod articulated with the other end of said lever, a pedal carried by the table for actuating said pull rod, a spring surrounding said plunger between said jib head at its lower end depressing the turret when it is not actuated upwardly by said lever, knee lever actuated means for completing an electric circuit through said box for heating the box to secure the pen thereto after the box has been pierced by the piercing tool and the pen inserted therein by the pen receptacle, an ejector arm fulcrummed on a stud projecting from said pedestal over said jib block, the upper end of said ejector arm underlying said mandrel, and pedal means for actuating the ejector arm.

8. An apparatus for assembling box pens, comprising, a support, a jib block carried thereon, a vertical bore through said jib block, a plunger reciprocable in said bore and depending below the block, an abutment on the plunger at its lower end a helical coil spring on the plunger between the abutment and the block urging the plunger downwardly in the bore, an abutment at the upper end of the plunger limiting said downward movement, an implement carried by the upper end of the plunger, a mandrel mounted on the support above the plunger aligned therewith in position to be engaged by said implement in its uppermost position, a knock-out lever pivotally mounted on the support between the mandrel and block and movable outwardly of the mandrel when the implement is in its lowermost position, and lever means carried by the support for reciprocating the plunger.

9. The structure of claim 8 wherein the plunger is rotatable and carries a plurality of implements at its upper end angularly spaced about the axis thereof, whereby the mandrel may be engaged for different purposes by operation of said lever means.

10. The structure of claim 8 wherein the mandrel is wired to selectively constitute an electrode, and switch means is carried on the support for selectively placing said electrode in electrical circuit.

References Cited in the file of this patent

UNITED STATES PATENTS

| | | |
|---|---|---|
| 1,351,909 | Johnson | Sept. 7, 1920 |
| 2,009,647 | Brusse et al. | July 30, 1935 |
| 2,045,372 | Schumacher | June 23, 1936 |
| 2,293,247 | Fentress | Aug. 18, 1942 |